Figure 1:
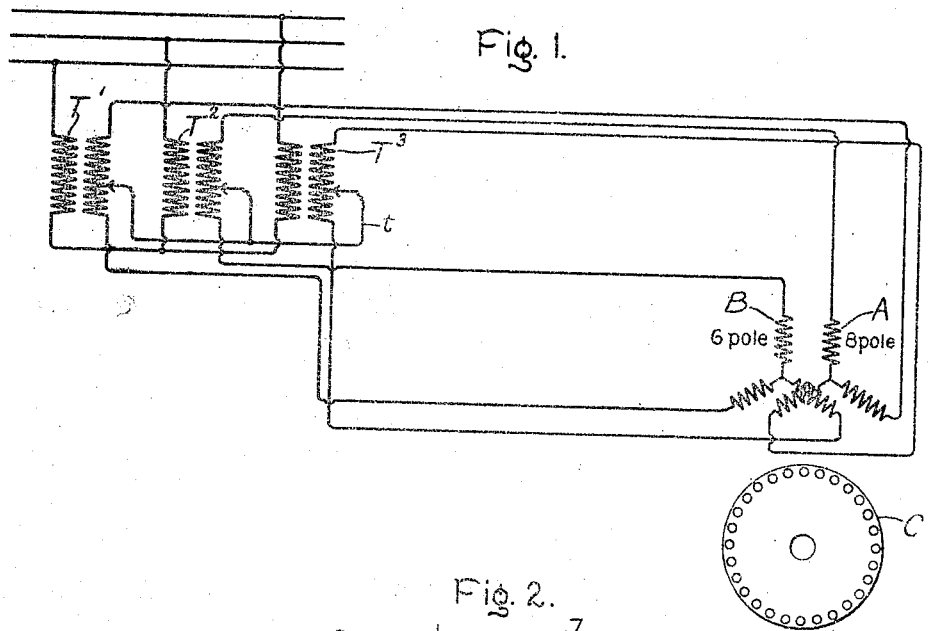

No. 882,581. PATENTED MAR. 24, 1908.
K. A. PAULY.
INDUCTION MOTOR CONTROL.
APPLICATION FILED MAR. 9, 1906.

Witnesses:
Burchard V. Kelley
Helen Oxford

Inventor
Karl A. Pauly
by Albert G. Davis
Att'y.

UNITED STATES PATENT OFFICE.

KARL A. PAULY, OF SCHENECTADY, NEW YORK, ASSIGNOR TO GENERAL ELECTRIC COMPANY, A CORPORATION OF NEW YORK.

INDUCTION-MOTOR CONTROL.

No. 882,581.

Specification of Letters Patent.

Patented March 24, 1908.

Application filed March 9, 1906. Serial No. 305,026.

*To all whom it may concern:*

Be it known that I, KARL A. PAULY, a citizen of the United States, residing at Schenectady, county of Schenectady, State of New York, have invented certain new and useful Improvements in Induction-Motor Control, of which the following is a specification.

My invention relates to the control of induction motors, and its object is to provide a novel method of, and means for, controlling such motors whereby they may be operated efficiently at varying speeds, and their speed increased or diminished step-by-step in as simple manner as is possible with a direct-current motor. It has been proposed heretofore so to arrange induction motors as to adapt them for connection for different pole numbers, thereby obtaining a plurality of different speeds. This has been accomplished both by varying the connections of a single winding and by providing the motor with a plurality of separate windings of different pole numbers. Such an arrangement gives a plurality of fixed speeds, but it has not been possible heretofore to shift gradually from one speed to another with any degree of efficiency.

The object of my invention is to provide a novel method of obtaining such a transition from one speed to another with high efficiency.

My invention consists in establishing the connections for both speeds simultaneously, supplying current to both sets of connections and varying the relative torques produced by the currents in these connections. By establishing the two sets of connections simultaneously and supplying current to both sets, a speed is produced somewhere between the two speeds corresponding to the two different pole numbers. The current in the connections for the smaller number of poles attempts to pull the motor up to the higher of the two limiting speeds, but when the speed corresponding to synchronism for the greater number of poles is passed, the current in that set of connections exerts a negative torque,—or, in other words, produces a generator action which tends to return current to the line. The resultant torque is the difference between the positive torque produced by the current in the connections corresponding to the smaller number of poles and the negative torque produced by the current in the other set of connections. By varying these torques relatively to each other, the speed of the motor for a given torque may be varied, and may be made to assume any desired value between the two limiting speeds.

More specifically stated, my invention consists in modifying the relative torques produced by the currents in the two sets of connections of different pole-numbers by varying the relative voltages supplied thereto. By means of this method of control, a short-circuited armature of the squirrel-cage type may be employed, thus avoiding the increased cost and complication of a coil-wound secondary.

My invention further comprises certain arrangements of controlling means adapted for the convenient practice of the control above described.

Figure 2:
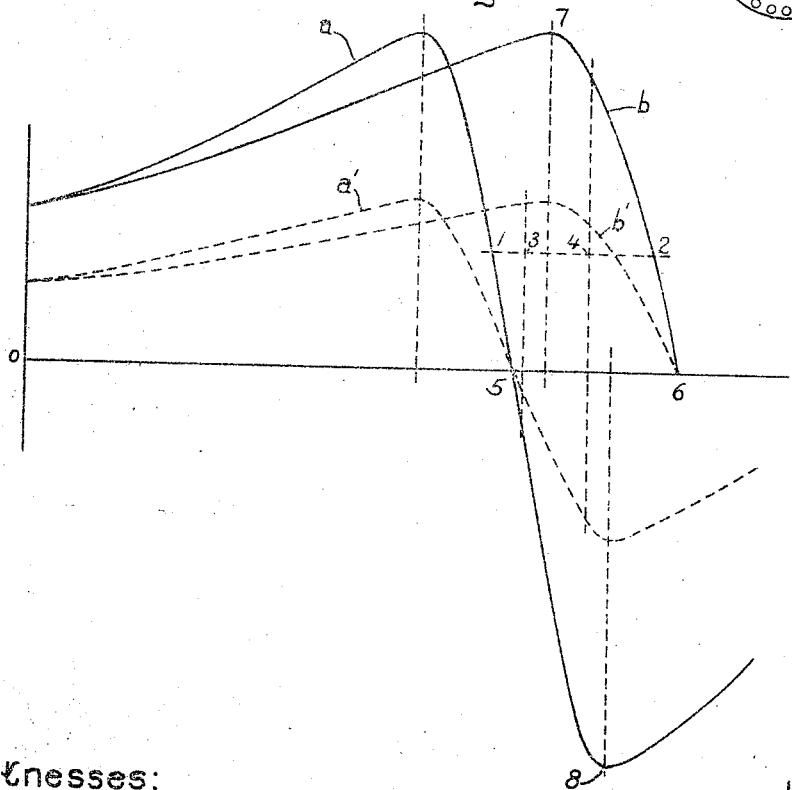

My invention will best be understood by reference to the accompanying drawings, in which Figure 1 shows diagrammatically an induction motor arranged for control in accordance with my invention; and Fig. 2 is an explanatory diagram.

Referring first to Fig. 2, the curves *a* and *b* represent the speed-torque characteristics of a motor connected for two different pole numbers. The ratio of the two pole numbers for the curves shown in this figure is 4 to 3, and the figure may be considered for example as representing the curves of a motor connected for eight poles and for six poles, respectively. The curve *a* is shown continued beyond synchronous speed represented by the point 5. Beyond this point the torque becomes negative, indicating the well-known generator action above synchronism. If only one set of connections is operative, the speed-torque characteristic of the motor is represented by the corresponding curve *a* or *b*. Let it be assumed that the full-load torque is the same at both limiting speeds, and is represented by the points 1 and 2, respectively. Now, if it is desired to obtain a corresponding torque at a plurality of speeds between 1 and 2, which may be represented by points along the line 1—2, this can be accomplished by connecting the motor for both pole numbers at the same time and varying the relative torques due to the two sets of connections. Thus, for instance, assume that voltage is being supplied to a set of connections, producing the pole number indicated by the curve $a$, and assume that a reduced voltage is supplied to the other set of connections, of an amount sufficient to give a torque one-half that indicated by the curve $b$. This reduced torque is indicated by the curve $b'$. Under these conditions, a torque corresponding to the line 1—2 will be produced at a speed corresponding to the vertical line 3, since the difference between the ordinates of the curves $a$ and $b'$ at the line 3 is equal to the distance from the line 1—2 to the speed axis. Similarly, if full voltage is supplied to the six-pole side of connections and reduced voltage sufficient to give half torque to the eight-pole connections, the conditions will be represented by the curves $b$ and $a'$. Under these conditions a torque corresponding to the line 1—2 will be produced at a speed corresponding to the vertical line 4, since the difference between the ordinates of the curve $b$ and $a'$ at this line is equal to the distance from the line 1—2 to the speed axis. Obviously, by further varying the relative voltages impressed on the six-pole and eight-pole sets of connections, the same torque may be obtained at any other desired speeds intermediate the two limiting speeds.

When the specific method of control indicated by the diagram is employed,—that is, when the relative torques produced by the two sets of connections are controlled by varying the relative voltages supplied to the two sets of connections, the relative pole numbers should be so chosen that the maximum negative point 8 on the curve $a$ occurs at a higher speed than the maximum point 7 on the curve $b$, as indicated in the drawings. If this is not the case, the control by varying the relative voltages will give a certain range of unstable operation between these maximum points. This will be evident from an inspection of the relative slopes of the two torque curves. But provided the point 8 occurs at a higher speed than the point 7, the operation is stable over the entire range. This relative position of the maximum points is obtained with an induction motor as ordinarily designed with a pole ratio from 4 to 3, as illustrated, and may ordinarily be obtained with a pole ratio as high as 3 to 2. This ratio is high enough for ordinary purposes, and the use of voltage control renders it possible to use a short-circuited secondary member of the squirrel-cage type.

Now referring to Fig. 1, the arrangement of the motor and its circuit connections will be readily understood.

A and B represent two primary windings connected for eight poles and six poles, respectively. The particular arrangement of these windings for obtaining these pole numbers forms no part of my invention, and will be readily understood by those skilled in the art. Furthermore, although I have indicated two distinct windings for obtaining the two pole numbers, this arrangement is not essential to my invention in its broader aspects.

C represents a short-circuited rotor of the squirrel-cage type. When either winding A or B alone is energized the rotor C will operate at a speed corresponding to the number of poles in the primary. When both windings are energized the rotor will take an intermediate speed, as has been above explained. In order to obtain the voltage control of the primary windings, I have shown a three-phase arrangement of transformers $T^1$, $T^2$ and $T^3$. The primaries of these transformers are shown connected in Y to a source of three-phase current, while each of the secondaries has its opposite terminals connected to the two primary motor windings, respectively. A short-circuiting switch member $t$ is arranged to connect successively different points on each transformer secondary to corresponding points on the other secondaries. With this arrangement, when the member $t$ occupies any intermediate position, as shown, the upper portions of the three transformer secondaries are connected in Y to the eight-pole motor winding, while the lower portions are simultaneously connected in Y to the six-pole motor. By moving the member $t$ up or down, the voltages impressed on the two motor windings are simultaneously and oppositely varied. When the member $t$ is in either extreme position, one of the motor windings is short-circuited, while the other has the full secondary voltage impressed upon it, and the motor consequently operates as though it had only a single winding. Of course it will be understood that if the pole numbers should not be such that the two primary windings are non-inductive with respect to each other, the controlling device should not be arranged to short-circuit either winding.

Although I have shown and described a motor arranged for only two different pole numbers, my invention is not limited to such a motor but may be employed to obtain gradual transition from one speed to another in a motor arranged for connection for any number of pole numbers.

I do not desire to limit myself to the particular connections and arrangement of parts here shown, but aim in the appended claims to cover all modifications which are within the scope of my invention.

What I claim as new and desire to secure by Letters Patent of the United States, is,—

1. The method of operating an induction motor at varying speeds which consists in establishing two sets of connections adapted to produce tendencies toward operation at two different limiting or synchronous speeds, supplying current to both sets of connections simultaneously, and varying the relative torques produced thereby.

2. The method of operating an induction motor at varying speeds which consists in establishing two sets of connections adapted to produce tendencies toward operation at two different limiting or synchronous speeds, supplying current to both sets of connections simultaneously, and varying the relative voltages supplied to the two sets.

3. The method of operating an induction motor at varying speeds which consists in establishing two sets of connections adapted to produce operation at two different speeds, supplying current to both sets of connections simultaneously, and varying simultaneously and oppositely the torques produced by the two sets of connections.

4. The method of operating at varying speeds an induction motor having two windings of different pole numbers, which consists in connecting both windings to a source of voltage so as to cause them to produce simultaneously in the motor tendencies to run at two different speeds and varying the relative torques produced by the two windings.

5. The method of operating at varying speeds an induction motor having two windings of different pole numbers, which consists in connecting both windings to a source of voltage and varying simultaneously and oppositely the torques produced by the two windings.

6. The method of operating at varying speeds an induction motor having two windings of different pole numbers, which consists in connecting both windings to a source of voltage so as to cause them to produce simultaneously in the motor tendencies to run at two different speeds and varying the speed-torque characteristics of the motor corresponding to the two pole numbers.

7. The method of operating at varying speeds an induction motor having two windings of different pole numbers, which consists in connecting both windings to a source of voltage so as to cause them to produce simultaneously in the motor tendencies to run at two different speeds and varying the relative voltages impressed on said windings.

8. The method of operating at varying speeds an induction motor having two windings of different pole numbers, which consists in connecting both windings to a source of voltage and varying simultaneously and oppositely the voltages impressed on the two windings.

9. In combination, an induction motor adapted to be connected for two different pole numbers, means for supplying current to both sets of connections simultaneously so as to produce in the motor tendencies to run at two different speeds, and means for varying the relative torques produced by the currents in the two sets of connections.

10. In combination, an induction motor adapted to be connected for two different pole numbers, means for supplying current to both sets of connections simultaneously, and means for varying simultaneously and oppositely the torques produced by the currents in the two sets of connections.

11. In combination, an induction motor having a short-circuited secondary member and a primary member adapted to be connected for two different pole numbers, means for supplying current to both sets of connections simultaneously, and means for varying the relative voltages impressed on the two sets.

12. In combination, an induction motor having a short-circuited secondary member and a primary member adapted to be connected for two different pole numbers, means for supplying current to both sets of connections simultaneously, and means for varying simultaneously and oppositely the voltages impressed on the two sets of connections.

13. In combination with an induction motor having a single rotor and having two windings of different pole numbers, means for supplying current to both windings, and switching means for varying the relative torques produced by the two windings.

14. In combination with an induction motor having two windings of different pole numbers, means for supplying current to both windings, and switching means for varying simultaneously and oppositely the torques produced by the two windings.

15. In combination with an induction motor having a single rotor and having two windings of different pole numbers, means for supplying current to both windings, and a switch connected to said windings for varying the relative voltages impressed on said windings.

16. In combination with an induction motor having two windings of different pole numbers, means for supplying current to both windings, and a switch connected to said windings for varying simultaneously and oppositely the voltages impressed on said windings.

17. In combination with an induction motor having a single rotor and having two windings of different pole numbers, means for supplying current to both windings, and switching means in circuit with the motor arranged to modify the speed-torque characteristics of the motor corresponding to the two pole numbers.

18. In combination, an induction motor having two primary windings of different pole numbers and a short-circuited secondary member, means for supplying current to both primary windings, and means for varying the relative voltages impressed on said windings.

19. In combination, an induction motor having two primary windings of different pole numbers and a short-circuited secondary member, means for supplying current to both primary windings, and means for varying simultaneously and oppositely the voltages impressed on the two windings.

20. In combination, an induction motor having two three-phase primary windings of different pole numbers, a three-phase arrangement of supply transformers, connections from opposite terminals of each transformer secondary to the two motor windings respectively, and means for connecting together different but corresponding points on said secondaries.

21. In combination, an induction motor having two three-phase primary windings of different pole numbers, a three-phase arrangement of supply transformers, connections from opposite terminals of each transformer secondary to the two motor windings respectively, and a short-circuiting switching member arranged to connect successively different points on each secondary to corresponding points on the other secondaries.

In witness whereof, I have hereunto set my hand this 7th day of March, 1906.

KARL A. PAULY.

Witnesses:
BENJAMIN B. HULL,
HELEN ORFORD.